(12) United States Patent
Xue et al.

(10) Patent No.: US 11,459,722 B2
(45) Date of Patent: Oct. 4, 2022

(54) OPTIMAL DESIGN METHOD AND SYSTEM FOR SLOPE REINFORCEMENT WITH ANTI-SLIDE PILES

(71) Applicant: INSTITUTE OF GEOLOGY AND GEOPHYSICS, CHINESE ACADEMY OF SCIENCES, Beijing (CN)

(72) Inventors: Lei Xue, Beijing (CN); Chao Xu, Beijing (CN); Yuan Cui, Beijing (CN); Mengyang Zhai, Beijing (CN); Fengchang Bu, Beijing (CN); Haijun Zhao, Beijing (CN); Songfeng Guo, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/515,817

(22) Filed: Nov. 1, 2021

(65) Prior Publication Data
US 2022/0207196 A1 Jun. 30, 2022

(30) Foreign Application Priority Data
Dec. 25, 2020 (CN) .......................... 202011559525.0

(51) Int. Cl.
*E02D 17/20* (2006.01)
*G06F 30/23* (2020.01)
(Continued)

(52) U.S. Cl.
CPC ........... *E02D 17/207* (2013.01); *G06F 30/20* (2020.01); *G06F 30/23* (2020.01); *G06F 2111/06* (2020.01); *G06F 2111/10* (2020.01)

(58) Field of Classification Search
CPC ....... E02D 17/207; G06F 30/23; G06F 30/20; G06F 2111/06; G06F 2111/10
See application file for complete search history.

(56) References Cited

U.S. PATENT DOCUMENTS 5,099,696 A * 3/1992 Yabuuchi ................ E02D 1/022
405/232
6,349,590 B1 * 2/2002 Wai ......................... G01N 3/303
73/84

(Continued)

FOREIGN PATENT DOCUMENTS

CN 106021850 A * 10/2016 ............. G06F 19/00
CN 107844835 A * 3/2018 ............. G06N 3/006

(Continued)

OTHER PUBLICATIONS

Ho, I-Hsuan "Three-Dimensinoal Finite Element Analysis for Soil Slopes Stabilisation Using Piles" Geomechancis & Geoengineering (2017) available from <http://dx.doi.org/10.1080/17486025.2017.1347286> (Year: 2017).*

(Continued)

*Primary Examiner* — Jay Hann
(74) *Attorney, Agent, or Firm* — Global IP Counselors, LLP (57) ABSTRACT

An optimal design method and system for slope reinforcement with anti-slide piles includes: modeling a slope type to obtain a three-dimensional (3D) slope numerical calculation model; establishing different numerical calculation models for anti-slide piles according to different reinforcement schemes of the anti-slide piles; determining optimization indexes through a coupling analysis of the 3D slope numerical calculation model and the anti-slide pile numerical calculation model; calculating a comprehensive optimization value according to the optimization index; determining an optimal anti-slide pile reinforcement scheme according to (Continued)

the comprehensive optimization value, and determining whether the optimal anti-slide pile reinforcement scheme meets the optimization objective; and carrying out slope reinforcement according to the optimal anti-slide pile reinforcement scheme if yes. A multi-objective comprehensive optimization model including an optimization index system and comprehensive weights of optimization indexes is established.

4 Claims, 3 Drawing Sheets

(51) Int. Cl.
  *G06F 111/10* (2020.01)
  *G06F 111/06* (2020.01)
  *G06F 30/20* (2020.01)

(56) References Cited

U.S. PATENT DOCUMENTS

| | | | | |
|---|---|---|---|---|
| 7,383,236 | B2* | 6/2008 | Jin | G06N 3/126 706/913 |
| 2021/0266781 | A1* | 8/2021 | Alkurd | H04W 72/087 |

FOREIGN PATENT DOCUMENTS

| | | | |
|---|---|---|---|
| CN | 111400785 | A * | 7/2020 |
| CN | 111400785 | A | 7/2020 |

OTHER PUBLICATIONS

Cai, F & Ugai, K. "Numerical Analysis of the Stability of a Slope Reinforced with Piles" Soils & Foundations, vol. 40, No. 1, pp. 73-84 (2000) (Year: 2000).*
Ho, I-Hsuan "Optimization of Pile Reinforced Slopes Using Finite Element Analyses" Thesis, Iowa State U. (2009) (Year: 2009).*
Deng, M. "Reliability-Based Optimization Design of Geosynthetic Reinforced Embankment Slopes" Thesis, Missouri U. of Science & Tech. (2015) (Year: 2015).*
Machine translation of CN-107844835-A (Year: 2018).*
Partial human translation of CN-106021850-A (Year: 2016).*
Kaabi, H. & Jabeur, K. "TOPSIS using a mixed subjective-objective criteria weights for ABC inventory Classification" IEEE Int'l Conf. on Intelligent Sys. Design & Applications, (2016) available from <https://ieeexplore.ieee.org/abstract/document/7489161> (Year: 2016).*
Fang, L., et al. "The Optimization of the Anti-Slide Piles Location in Slope Control Project" Int'l Conf. on Civil, Mechanical, & Materials Engineering AIP Conf. Proceedings, vol. 1973, issue 1 (2018) available from <https://aip.scitation.org/doi/abs/10.1063/1.5041403> (Year: 2018).*
Wang Xiaofang and Xia Lingqiong., Anti-slide pile strength and pile position factor-based study on safety and stability of slope, J. Water Resources and Hydropower Engineering, Aug. 31, 2020, vol. 51, Issue 8, pp. 152-158.
The First Office Action for the corresponding Chinese application No. 202011559525.0, dated Jun. 11, 2021.

* cited by examiner

OPTIMAL DESIGN METHOD AND SYSTEM FOR SLOPE REINFORCEMENT WITH ANTI-SLIDE PILES

CROSS-REFERENCE TO RELATED APPLICATIONS

This application claims priority to Chinese patent application number 202011559525.0 filed on Dec. 25, 2020, the disclosure of which is hereby incorporated herein by reference in its entirety.

BACKGROUND

Field of the Invention

The present disclosure relates to the field of slope reinforcement, in particular to an optimal design method and system for slope reinforcement with anti-slide piles.

Background Information

In recent years, with the rapid development of global engineering construction, slope stability has become an important engineering geological problem. The anti-slide pile has been widely used in the slope reinforcement field because of its strong anti-sliding ability and convenient construction. However, due to the unreasonable optimal design of the anti-slide pile, the slope is still unstable after reinforcement and the project budget is overrun. It can be seen that the optimal design of the anti-slide pile in the slope reinforcement field is very important and needs to be further improved.

At present, the optimal design methods are commonly used for the anti-slide piles mainly include the limit equilibrium method, physical model test method and numerical simulation method. The core idea for the limit equilibrium method is to firstly calculate the anti-sliding force required for the safety of the slope, then calculate the bending moment and shear force of each anti-slide pile, and finally derive the design parameters such as pile length and pile spacing. However, the relevant assumptions of this method are inconsistent with reality, and it fails to consider the interaction between the pile and the soil. The physical model test method (centrifuge test, shaking table test, etc.) takes into account the interaction between the pile and the soil, and has good consistency with actual engineering cases. However, this method is hard to accurately describe the original topography and scale of the real slope, and the selection of similar materials has a great impact on the accuracy of the test result. With the rapid development of computer technology, the numerical simulation technology provides a new solution for the optimal design of the anti-slide pile, which can better reflect the influences of pile length, pile position, pile spacing and other factors on the effect of slope reinforcement. However, the above-mentioned research methods often only take the factor of safety of the slope reinforced as the only optimization objective, and ignore the safety of the anti-slide pile itself, which is also the reason for many slopes still instable after reinforcement. In addition, the optimal design method of the anti-slide pile based on the finite element method (FEM) and analytic hierarchy process (AHP) fails to fully consider the synergy between the various elements in the design process, and cannot give quantitative optimization results.

SUMMARY

In view of the above problems, the present disclosure provides an optimal design method and system for slope reinforcement with anti-slide piles. The present disclosure establishes a multi-objective comprehensive optimization model including an optimization index system and comprehensive weights of optimization indexes. The optimization index system comprehensively reflects the stability of a slope and the safety of an anti-slide pile, and the comprehensive weights of optimization indexes are determined by a subjective analytic hierarchy process (AHP) and an objective entropy method, making an optimization result more scientific.

To achieve the above purpose, the present disclosure provides the following technical solutions.

An optimal design method for slope reinforcement with anti-slide piles includes the following steps:

determining a type of a slope to be reinforced with anti-slide piles and an optimization objective;

modeling the type of the slope to obtain a three-dimensional (3D) slope numerical calculation model;

establishing different numerical calculation models for anti-slide piles according to different reinforcement schemes of the anti-slide piles;

determining optimization indexes through a coupling analysis of the 3D slope numerical calculation model and the anti-slide pile numerical calculation model, the optimization indexes including factor of safety, bending moment, shear force and deflection of the anti-slide piles;

calculating a comprehensive optimization value according to the optimization index;

determining an optimal anti-slide pile reinforcement scheme according to the comprehensive optimization value, and determining whether the optimal anti-slide pile reinforcement scheme meets the optimization objective;

carrying out slope reinforcement according to the optimal anti-slide pile reinforcement scheme if yes; and re-determining an optimal anti-slide pile reinforcement scheme if not.

Optionally, a numerical simulation technology is used to establish the 3D slope numerical calculation model and the anti-slide pile numerical calculation model, and perform the coupling analysis of the 3D slope numerical calculation model and the anti-slide pile numerical calculation model.

Optionally, the calculating a comprehensive optimization value according to the optimization index specifically includes:

normalizing the optimization index to obtain a relative membership degree;

calculating a comprehensive weight of the optimization index; and calculating a comprehensive optimization value according to the relative membership degree and the comprehensive weight of the optimization index.

Optionally, the factor of safety is a positive index, which is normalized as follows:

$$r_{(i,j)} = \alpha + \beta \cdot e^{\frac{a_{(i,j)} - a_{(i,j)max}}{a_{(i,j)max} - a_{(i,j)min}}}$$

the bending moment, shear force and deflection of the anti-slide piles are negative indexes, which are normalized as follows:

$$r_{(i,j)} = \alpha + \beta \cdot e^{\frac{a_{(i,j)min} - a_{(i,j)}}{a_{(i,j)max} - a_{(i,j)min}}}$$

where, $a_{(i,j)min}$ and $a_{(i,j)max}$ respectively represent a minimum value and a maximum value of an i-th optimization index in a j-th anti-slide pile reinforcement scheme; $r_{(i,j)}$ represents an optimization index value after normalization, that is, the relative membership degree; α and β are constants, which satisfy α+β=100.

Optionally, the comprehensive weight of the optimization index is calculated as follows:

$$w_{(i)} = \frac{w_{s(i)} \cdot w_{o(i)}}{\sum_{i=1}^{n} w_{s(i)} \cdot w_{o(i)}}$$

where, $w_{(i)}$ represents the comprehensive weight of the optimization index; $w_{s(i)}$ and $w_{o(i)}$ represent a subjective weight and an objective weight of the optimization index; n represents a count of the optimization indexes;
the objective weight of the optimization index is determined by using an entropy method and expressed as follows:

$$w_{o(i)} = \frac{1 - e_{(i)}}{\sum_{i=1}^{n}(1 - e_{(i)})}$$

where, $e_{(i)}$ represents an entropy of the i-th optimization index.

Optionally, the comprehensive optimization value is calculated as follows:

$$k_{(j)} = \sum_{i=1}^{n}\sum_{j=1}^{m} w_{(i)} \cdot r_{(i,j)}$$

where, $k_{(j)}$ represents a comprehensive optimization value of the j-th anti-slide pile reinforcement scheme; $w_{(i)}$ represents a comprehensive weight of the optimization index; $r_{(i,j)}$ represents a relative membership degree of the i-th optimization index in the j-th anti-slide pile reinforcement scheme; n represents a count of the optimization indexes; m represents a count of the anti-slide pile reinforcement schemes.

An optimal design system for slope reinforcement with anti-slide piles includes:
a slope type and optimization objective determination module, for determining a type of a slope to be reinforced with anti-slide piles and an optimization objective;
a first modeling module, for modeling the type of the slope to obtain a 3D slope numerical calculation model;
a second modeling module, for establishing different numerical calculation models for anti-slide piles according to different reinforcement schemes of the anti-slide piles;
an optimization index determination module, for determining optimization indexes through a coupling analysis of the 3D slope numerical calculation model and the anti-slide pile numerical calculation model, the optimization indexes including factor of safety, bending moment, shear force and deflection of the anti-slide piles;
a comprehensive optimization value calculation module, for calculating a comprehensive optimization value according to the optimization index;
an optimal anti-slide pile reinforcement scheme determination module, for determining an optimal anti-slide pile reinforcement scheme according to the comprehensive optimization value, and determining whether the optimal anti-slide pile reinforcement scheme meets the optimization objective; and
a reinforcement module, for carrying out slope reinforcement according to the optimal of anti-slide pile reinforcement scheme if the optimal anti-slide pile reinforcement scheme meets the optimization objective.

Based on the specific embodiments, the present disclosure has the following technical effects:

1. The present disclosure establishes a three-dimensional (3D) slope reinforcement numerical calculation model, which reflects a pile-soil interaction and can accurately derive optimization index values under different reinforcement schemes.

2. The present disclosure establishes an optimization index system in the multi-objective comprehensive optimization model, taking into account the stability of the slope after reinforcement and the safety of the anti-slide piles.

3. The present disclosure establishes a method for determining the comprehensive weights of the optimization indexes in the multi-objective comprehensive optimization model, which eliminates the arbitrary and randomness caused by too many subjective factors and emphasizes the objectivity of the optimization process, making the result more scientific.

BRIEF DESCRIPTION OF DRAWINGS

To describe the technical solutions in embodiments of the present disclosure or in the prior art more clearly, the accompanying drawings needed in the embodiments are introduced below briefly. Apparently, the accompanying drawings in the following description show merely some embodiments of the present disclosure, and other drawings can be derived from these accompanying drawings by those of ordinary skill in the art without creative efforts.

DETAILED DESCRIPTION OF EMBODIMENT(S)

The technical solutions of the embodiments of the present disclosure are clearly and completely described below with reference to the accompanying drawings. Apparently, the described embodiments are merely a part rather than all of the embodiments of the present disclosure. All other embodiments derived from the embodiments of the present disclosure by a person of ordinary skill in the art without creative efforts should fall within the protection scope of the present disclosure.

An objective of the present disclosure is to provide an optimal design method and system for slope reinforcement with anti-slide piles. The present disclosure establishes a multi-objective comprehensive optimization model including an optimization index system and comprehensive weights of optimization indexes. The optimization index system comprehensively reflects the stability of a slope and the safety of an anti-slide pile, and the comprehensive weights of optimization indexes are determined by a subjective analytic hierarchy process (AHP) and an objective entropy method, making an optimization result more scientific.

The present disclosure establishes numerical calculation models for a coupling analysis of a slope and an anti-slide pile, which solves the technical problem that the prior art fails to consider the interaction between the pile and soil. The present disclosure acquires high-resolution digital elevation model (DEM) data of the slope by a drone, and establishes a 1:1 true three-dimensional numerical calculation model of the slope, which solves the problem that a laboratory model test fails to accurately describe the original topography and scale of the real slope. The present disclosure acquires rock and soil parameters by geological survey and other means, and solves the problem that similar material parameters are difficult to determine in the laboratory model test. The present disclosure establishes optimization indexes that comprehensively reflect the stability of the slope and the safety of the anti-slide pile, including the factor of safety, bending moment, shear force and deflection of the anti-slide piles, thus solving the problem that the existing optimization method ignores the safety status of the anti-slide piles. The present disclosure establishes a comprehensive weight determination method based on subjective and objective weights, which solves the problem of synergy between various elements in the optimal design of the anti-slide piles.

To make the above objectives, features and advantages of the present disclosure clearer and more comprehensible, the present disclosure is described in further detail below with reference to the accompanying drawings and specific implementations.

Figure 1:
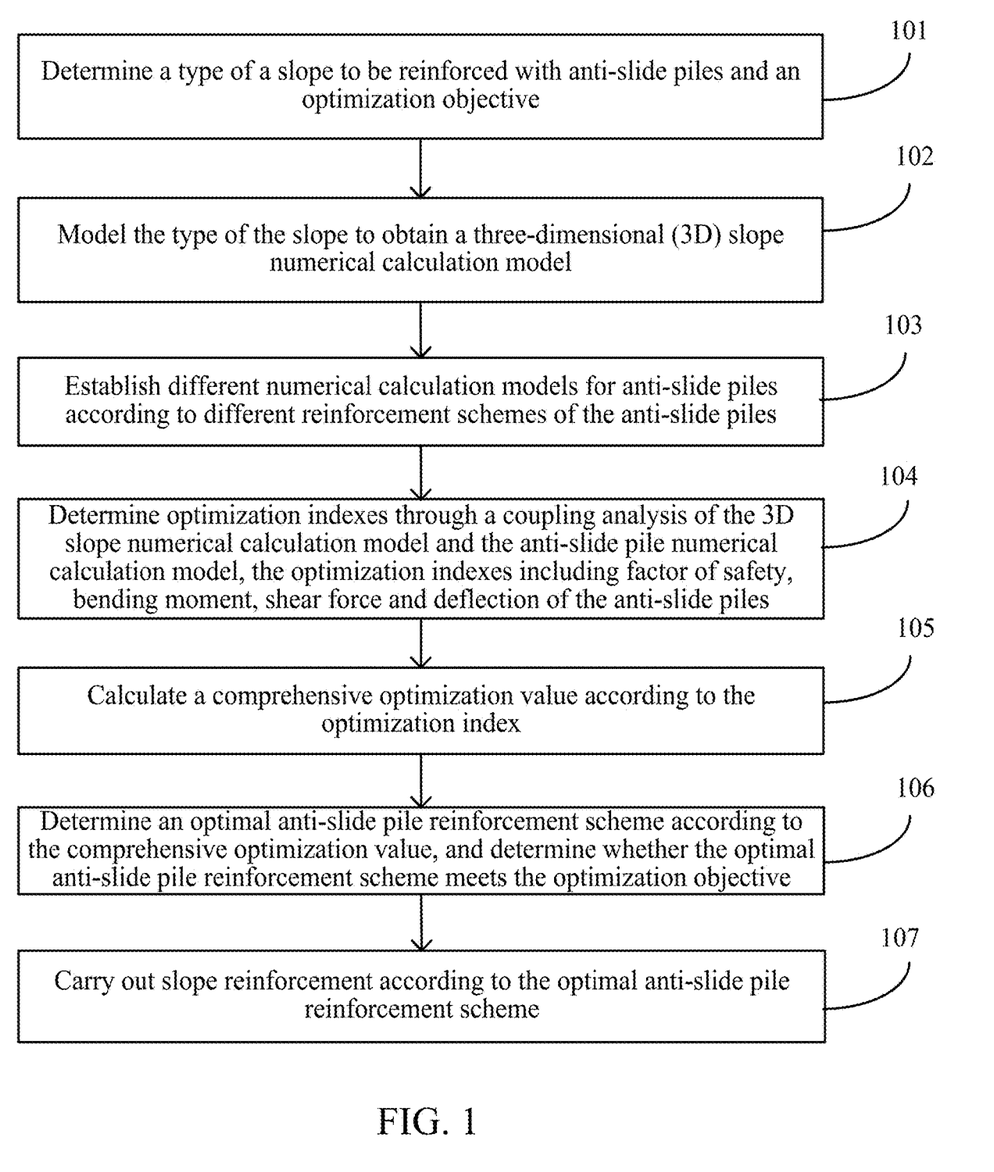
FIG. 1 is a flowchart of an optimal design method for slope reinforcement with anti-slide piles according to an embodiment of the present disclosure.

As shown in FIG. 1, an optimal design method for slope reinforcement with anti-slide piles includes the following steps:

Step 101: Determine a type of a slope to be reinforced with anti-slide piles and an optimization objective.

According to an actual slope project that needs anti-slide pile reinforcement, basic geological data including the slope type and stratum parameters are determined, and optimization objectives are determined as to improve the stability of slope, the safety of anti-slide piles and reduce the project cost.

Step 102: Model the type of the slope to obtain a three-dimensional (3D) slope numerical calculation model.

For complex slopes, high-resolution DEM data are acquired by drone photography; a true 3D surface model reflecting the undulations of the slope is constructed by numerical modeling software Rhino, which imported into numerical calculation and analysis software (such as FLAC$^{3D}$) to establish a true 3D model of the slope. For simple slopes, the modeling can be performed directly through a built-in command flow of the software according to the relevant shape parameters of the slope, which is convenient and quick.

Step 103: Establish different numerical calculation models for anti-slide piles according to different reinforcement schemes of the anti-slide piles.

The reinforcement scheme design of the anti-slide piles includes pile body parameters, pile locations, pile section parameters, pile lengths, pile spacings and the like. According to different design schemes, a variety of numerical calculation models of the anti-slide piles are established and coupled with the slope model for analysis.

Step 104: Determine optimization indexes through a coupling analysis of the 3D slope numerical calculation model and the anti-slide pile numerical calculation model, the optimization indexes including factor of safety, bending moment, shear force and deflection of the anti-slide piles.

Through finite difference FLAC$^{3D}$ software or other numerical calculation analysis software, the 3D slope numerical calculation model and the anti-slide pile numerical calculation model are coupled for analysis and calculation, and relevant optimal design index parameters are extracted therefrom.

Step 105: Calculate a comprehensive optimization value according to the optimization index.

The establishment of a multi-objective comprehensive optimization model mainly includes Steps 104 and 105. As the core of this method, Steps 104 and 105 mainly include:

(1) Construction of Optimization Index System

The optimization indexes are determined through a coupling analysis of the 3D slope numerical calculation model and the anti-slide pile numerical calculation model, including the factor of safety which reflects the stability of the slope and bending moment, shear force and deflection which reflect the safety of the anti-slide piles.

(2) Calculation and Normalization of Optimization Index Values

According to numerical simulation analysis results obtained in Step 104, the factor of safety, bending moment, shear force and deflection under different reinforcement schemes of anti-slide piles are extracted respectively, and the optimization indexes are subjected to max-min normalization by a percentile system. For the convenience of presentation, suppose that there are m schemes in total, and each scheme includes n optimization indexes.

The factor of safety and other positive indexes are normalized as follows:

$$r_{(i,j)} = \alpha + \beta \cdot e^{\frac{a_{(i,j)} - a_{(i,j)max}}{a_{(i,j)max} - a_{(i,j)min}}} \quad (1)$$

The bending moment, shear force, deflection and other negative indexes are normalized as follows:

$$r_{(i,j)} = \alpha + \beta \cdot e^{\frac{a_{(i,j)min} - a_{(i,j)}}{a_{(i,j)max} - a_{(i,j)min}}} \quad (2)$$

In the equation, $a_{(i,j)min}$ and $a_{(i,j)max}$ respectively represent a minimum value and a maximum value of an i-th optimization index in a j-th scheme; $r_{(i,j)}$ represents an optimization index value after normalization, that is, the relative membership degree; $\alpha$ and $\beta$ are constants, which satisfy $\alpha+\beta=100$.

(3) Determination on Comprehensive Weights of Optimization Indexes

In this model, the comprehensive weight of the optimization index is determined by a subjective weight and an objective weight, where the subjective weight is determined by an AHP, and the objective weight is determined by an entropy method. Therefore, the comprehensive weight w(i) of the optimization index is determined as follows:

$$w_{(i)} = \frac{w_{s(i)} \cdot w_{o(i)}}{\sum_{i=1}^{n} w_{s(i)} \cdot w_{o(i)}} \quad (3)$$

In the equation, $w_{s(i)}$ and $w_{o(i)}$ respectively represent a subjective weight and an objective weight. The objective weight of the optimization index is determined by an entropy method and expressed as follows:

$$w_{o(i)} = \frac{1 - e_{(i)}}{\sum_{i=1}^{n} (1 - e_{(i)})} \quad (4)$$

In the equation, $e^{(i)}$ represents an entropy of an i-th optimization index.

(4) Calculation and Analysis of Optimization Results

A comprehensive optimization value $k_{(j)}$ is determined by a relative membership degree and the comprehensive weight of each optimization index under different reinforcement schemes:

$$k_{(j)} = \sum_{i=1}^{n} \sum_{j=1}^{m} w_{(j)} \cdot r_{(i,j)} \quad (5)$$

According to an optimal determination principle, a greater optimization value indicates a more reasonable reinforcement scheme.

Step 106: Determine an optimal anti-slide pile reinforcement scheme according to the comprehensive optimization value, and determine whether the optimal anti-slide pile reinforcement scheme meets the optimization objective.

According to the optimization result, the reinforcement scheme is verified whether it meets the optimization objectives of improving the stability of the slope and the safety of anti-slide piles and reducing the project cost, and whether it meets actual engineering experience. If these objectives are met, the scheme is determined as an optimal reinforcement scheme. Otherwise, the anti-slide pile reinforcement scheme needs to be redesigned and to undergo an optimal design again.

Step 107: Carry out slope reinforcement according to the optimal anti-slide pile reinforcement scheme.

Specific Embodiment

In order to explain the content of the present disclosure in more detail, an application analysis of the optimal design method and system for slope reinforcement with anti-slide piles is conducted below by using a finite difference method (FLAC$^{3D}$ simulation software).

Step 101: Determine a type of a slope to be reinforced with anti-slide piles and an optimization objective.

In order to explain the use of the method of the present disclosure more concisely and vividly, this embodiment is described by taking a homogeneous soil slope as an example. The physical and mechanical parameters (acquired by geological survey) of soil are shown in Table 1. The optimization objectives are to improve the stability of the slope and the safety of anti-slide piles and reduce the project cost.

TABLE 1

Physical and mechanical parameters of slope soil

| Material | Elastic modulus E (MPa) | Poisson ratio ν | Unit weight (kW/m$^3$) | Cohesion c (kPa) | Friction angle φ (°) |
|---|---|---|---|---|---|
| Soil | 200 | 0.25 | 20 | 24 | 24 |

Step 102: Model the type of the slope to obtain a 3D slope numerical calculation model.

Figure 2:
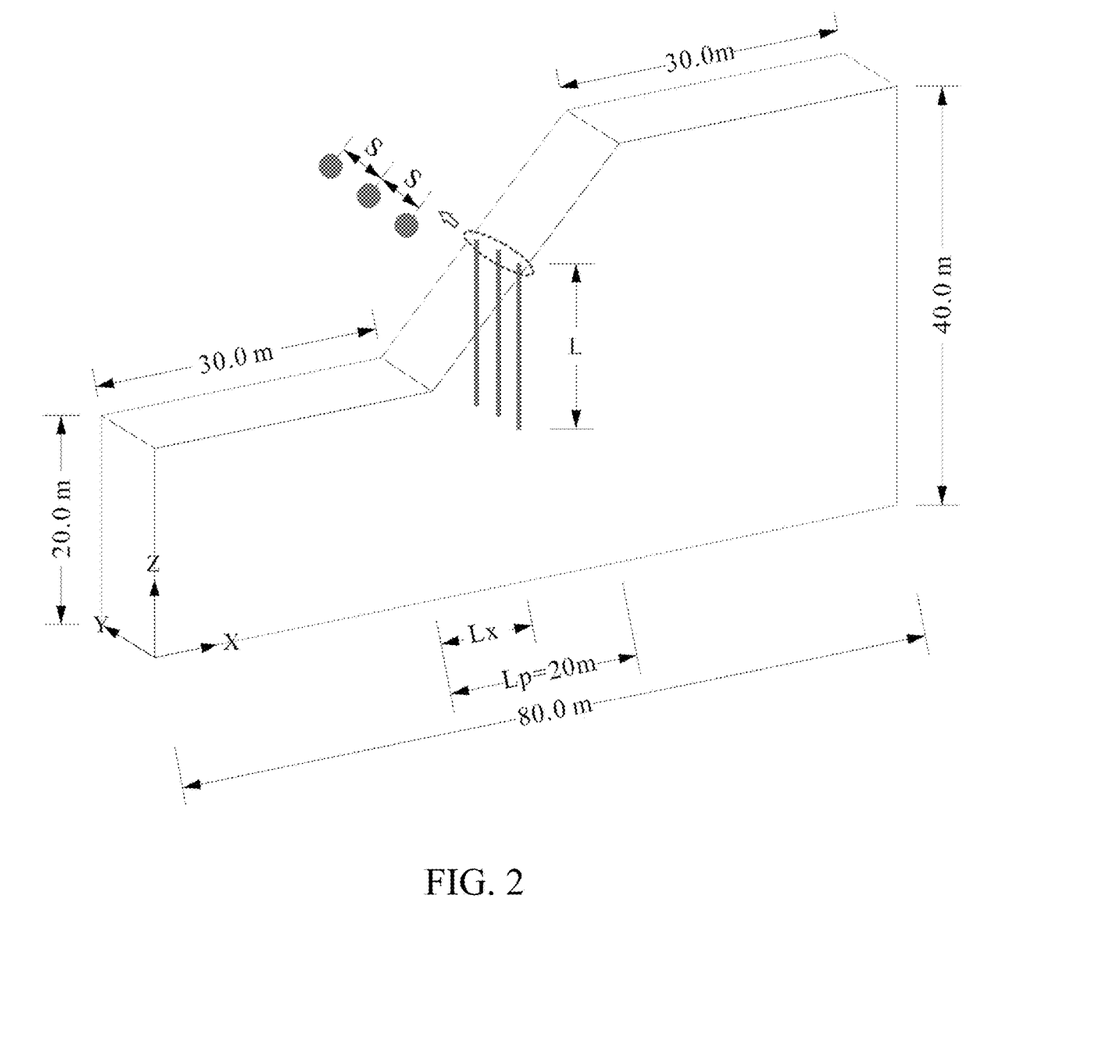
FIG. 2 shows a three-dimensional (3D) numerical calculation model of slope reinforcement with anti-slide piles according to an embodiment of the present disclosure.
Figure 3:
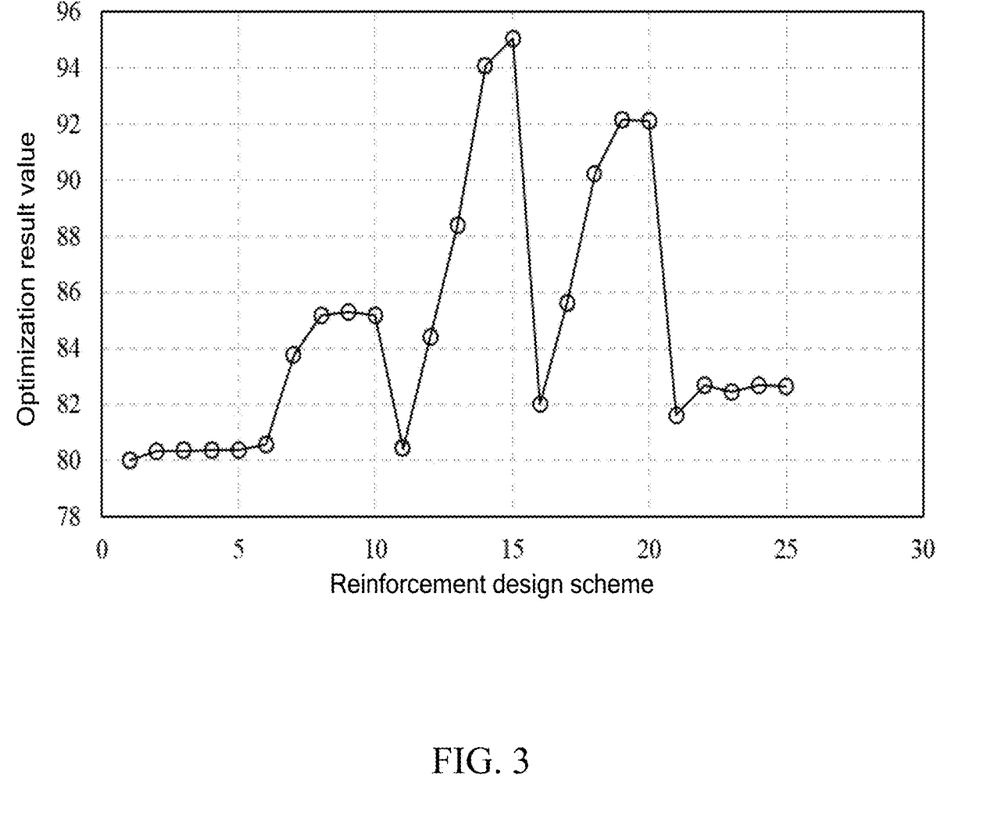
FIG. 3 shows an optimization result curve according to an embodiment of the present disclosure.

Taking a simple homogeneous slope as an example, the modeling is directly carried out by using a built-in command flow of the finite difference FLAC$^{3D}$ software, and a slope numerical model is established by using a solid element, as shown in FIG. 2.

Step 103: Establish different numerical calculation models for anti-slide piles according to different reinforcement schemes of the anti-slide piles.

The structural element pile can accurately reflect the force and deformation state of the pile, so the structural element pile is used to establish the anti-slide pile model, as shown in FIG. 2. The ratio of horizontal distance from the anti-slide pile to the slope toe ($L_x$) to the horizontal distance ($L_p$) is used to define the position of the anti-slide piles. In this embodiment, taking the pile spacing S=5 m as an example, anti-slide pile numerical calculation models with different reinforcement positions and pile lengths are established.

Step 104: Determine optimization indexes through a coupling analysis of the 3D slope numerical calculation model and the anti-slide pile numerical calculation model.

The influences of different pile positions ($L_x/L_p$) and pile lengths (L) on the reinforcement effect are studied through a pile-soil coupling analysis using a strength reduction method and a Mohr-Coulomb constitutive model. The detailed physical and mechanical parameters of the anti-slide pile are shown in Table 2.

TABLE 2

Physical and mechanical parameters of pile element

| Parameter | Value |
|---|---|
| Young modulus (GPa) | 30 |
| Poisson ratio | 0.21 |
| Moi-z (m$^4$) | 2.0 |
| Moi-y (m$^4$) | 4.5 |
| Moi-polar (m$^4$) | 6.5 |
| Coupling-cohesion-shear (MPa) | 19 |
| Coupling-stiffness-shear (MN/m$^2$) | 100 |
| Coupling-friction-shear (°) | 23 |
| Density (kg/m$^3$) | 2500 |
| Cross-sectional-area (m$^2$) | 6.0 |
| Coupling-cohesion-normal (MPa) | 19 |
| Coupling-stiffness- normal (MN/m$^2$) | 100 |
| Coupling-friction- normal (°) | 23 |
| Coupling-gap- normal | on |
| Perimeter (m) | 10 |

Step 105: Calculate a comprehensive optimization value according to the optimization index.

The establishment of a multi-objective comprehensive optimization model mainly includes Steps 104 and 105. As the core of this method, Steps 104 and 105 mainly include:

(1) Construction of Optimization Index System

In this embodiment, the factor of safety, bending moment, shear force and deflection of the anti-slide piles are selected as optimization indexes of the multi-objective comprehensive optimization model.

(2) Calculation and Normalization of Optimization Index Values

According to Step 104, the factor of safety, bending moment, shear force and deflection of the anti-slide piles under different anti-slide pile reinforcement schemes are extracted respectively, as shown in Table 3.

TABLE 3

Optimization index values derived by numerical simulation

| | Reinforcement scheme | | Optimization index system | | | |
|---|---|---|---|---|---|---|
| SN | Pile length (m) | Pile position | Factor of safely | Bending moment (MN·m) | Shear force (MN) | Deflection (mm) |
| 1 | 4 | 0.1 | 1.1020 | 0.0175 | 0.0129 | 6.5990 |
| 2 | 6 | | 1.1170 | 0.0543 | 0.0288 | 6.6706 |
| 3 | 8 | | 1.1170 | 0.0609 | 0.0293 | 4.9446 |
| 4 | 10 | | 1.1170 | 0.0638 | 0.0271 | 3.3483 |
| 5 | 12 | | 1.1170 | 0.0721 | 0.0272 | 2.8712 |
| 6 | 12 | 0.3 | 1.1330 | 0.1649 | 0.0498 | 9.6011 |
| 7 | 16 | | 1.2460 | 0.6604 | 0.1265 | 12.2886 |
| 8 | 18 | | 1.2890 | 0.9646 | 0.1619 | 14.0635 |
| 9 | 20 | | 1.2930 | 1.0041 | 0.1640 | 14.2040 |
| 10 | 24 | | 1.3000 | 1.4549 | 0.1645 | 15.8044 |
| 11 | 16 | 0.5 | 1.1450 | 0.3022 | 0.0721 | 28.0213 |
| 12 | 20 | | 1.2930 | 1.1134 | 0.1666 | 76.4857 |
| 13 | 24 | | 1.3950 | 2.1853 | 0.2588 | 100.0991 |
| 14 | 26 | | 1.4780 | 2.2550 | 0.2587 | 66.7549 |
| 15 | 28 | | 1.5080 | 3.8532 | 0.3673 | 84.9950 |
| 16 | 20 | 0.7 | 1.2000 | 0.4453 | 0.0832 | 33.7602 |
| 17 | 24 | | 1.3240 | 1.3312 | 0.1662 | 82.7357 |
| 18 | 28 | | 1.4300 | 2.4631 | 0.2432 | 118.0213 |
| 19 | 30 | | 1.4700 | 3.3541 | 0.3105 | 137.2803 |
| 20 | 32 | | 1.4650 | 3.2635 | 0.2992 | 99.8248 |
| 21 | 20 | 0.9 | 1.1760 | 0.2396 | 0.0490 | 26.2770 |
| 22 | 22 | | 1.2270 | 0.5513 | 0.0776 | 51.5052 |
| 23 | 26 | | 1.2380 | 1.1881 | 0.1294 | 42.1948 |
| 24 | 28 | | 1.2460 | 1.3405 | 0.1421 | 35.4616 |
| 25 | 30 | | 1.2460 | 1.4169 | 0.1472 | 31.7616 |

Normalization and Percentage Evaluation of the Optimization Index System:

The factor of safety is a positive index, which is normalized as follows:

$$r_{(i,j)} = \alpha + \beta \cdot e^{\frac{a_{(i,j)} - a_{(i,j)max}}{a_{(i,j)max} - a_{(i,j)min}}}$$

The bending moment, shear force and deflection of the anti-slide piles are negative indexes, which are normalized as follows:

$$r_{(i,j)} = \alpha + \beta \cdot e^{\frac{a_{(i,j)min} - a_{(i,j)}}{a_{(i,j)max} - a_{(i,j)min}}}$$

In the above equations, $\alpha=60$ and $\beta=40$; the normalized results of the optimization indexes are shown in Table 4.

TABLE 4

Normalized values of the optimization index system

| | Reinforcement scheme | | Optimization index system | | | |
|---|---|---|---|---|---|---|
| SN | Pile length (m) | Pile position | Factor of safety | Bending moment (MN·m) | Shear force (MN) | Deflection (mm) |
| 1 | 4 | 0.1 | 75.2551 | 99.9236 | 99.4631 | 98.9692 |
| 2 | 6 | | 75.7793 | 99.5728 | 97.9629 | 98.95 |
| 3 | 8 | | 75.7793 | 99.5098 | 97.9093 | 99.4157 |
| 4 | 10 | | 75.7793 | 99.4828 | 98.115 | 99.8513 |
| 5 | 12 | | 75.7793 | 99.4038 | 98.1127 | 99.9825 |
| 6 | 12 | 0.3 | 76.3583 | 98.5366 | 96.0617 | 98.1719 |
| 7 | 16 | | 81.0993 | 94.2182 | 89.8973 | 97.472 |

TABLE 4-continued

Normalized values of the optimization index system

| | Reinforcement scheme | | Optimization index system | | | |
|---|---|---|---|---|---|---|
| SN | Pile length (m) | Pile position | Factor of safety | Bending moment (MN·m) | Shear force (MN) | Deflection (mm) |
| 8 | 18 | | 83.2449 | 91.8099 | 87.4226 | 97.0168 |
| 9 | 20 | | 83.4553 | 91.51 | 87.2829 | 96.981 |
| 10 | 24 | | 83.828 | 88.2801 | 87.2477 | 96.5757 |
| 11 | 16 | 0.5 | 76.8064 | 97.2879 | 94.1499 | 93.6247 |
| 12 | 20 | | 83.4553 | 90.6947 | 87.1045 | 84.0838 |
| 13 | 24 | | 89.5128 | 83.7351 | 81.638 | 80.4696 |
| 14 | 26 | | 95.5792 | 83.342 | 81.6456 | 85.7528 |
| 15 | 28 | | 98.0663 | 75.9089 | 76.6011 | 82.7132 |
| 16 | 20 | 0.7 | 79.0228 | 96.0301 | 93.2364 | 92.3218 |
| 17 | 24 | | 85.1514 | 89.1322 | 87.134 | 83.0693 |
| 18 | 28 | | 91.9335 | 82.205 | 82.4798 | 78.0931 |
| 19 | 30 | | 94.9439 | 77.932 | 79.0716 | 75.846 |
| 20 | 32 | | 94.5526 | 78.3262 | 79.6064 | 80.5083 |
| 21 | 20 | 0.9 | 78.0218 | 97.8525 | 96.1354 | 94.031 |
| 22 | 22 | | 80.2154 | 95.1253 | 93.6928 | 88.6042 |
| 23 | 26 | | 80.7225 | 90.1491 | 89.6878 | 90.4981 |
| 24 | 28 | | 81.0993 | 89.0674 | 88.7823 | 91.9454 |
| 25 | 30 | | 81.0993 | 88.5392 | 88.4215 | 92.7697 |

(3) Determination on Comprehensive Weights of Optimization Indexes

The subjective weight of the optimization index is determined by using an AHP. According to the intention of decision makers, engineering experience and opinions of geohazard experts, the relative importance and subjective weights of each optimization index are derived by a 1-9 scale method, as shown in Table 5. In the judgment matrix, a maximum eigenvalue is 3, a consistency index (CI) is 0.05, and a consistency ratio (CR) is equal to 0.04 and less than 0.1, meeting the consistency requirements.

TABLE 5

Subjective weights of optimization indexes

| Optimization index | Factor of safety | Bending moment | Shear force | Deflection | Subjective weight |
|---|---|---|---|---|---|
| Factor of safety | 1 | 3 | 7 | 6 | 0.5570 |
| Bending moment | 1/3 | 1 | 5 | 4 | 0.2693 |
| Shear force | 1/7 | 1/5 | 1 | 1/4 | 0.0532 |
| Deflection | 1/6 | 1/4 | 4 | 1 | 0.1205 |

The objective weight of the optimization index is determined by using an entropy method, and calculated according to the following equation, as shown in Table 6.

$$w_{o(i)} = \frac{1 - e_{(i)}}{\sum_{i=1}^{n}(1 - e_{(i)})}$$

TABLE 6

Comprehensive weights of optimization indexes

| Optimization index | Subjective weight | Objective weight | Comprehensive weight |
|---|---|---|---|
| Factor of safety | 0.5570 | 0.4949 | 0.7883 |
| Bending moment | 0.2693 | 0.1660 | 0.1279 |

TABLE 6-continued

Comprehensive weights of optimization indexes

| Optimization index | Subjective weight | Objective weight | Comprehensive weight |
|---|---|---|---|
| Shear force | 0.0532 | 0.1715 | 0.0261 |
| Deflection | 0.1205 | 0.1676 | 0.0577 |

The comprehensive weight of the optimization index is calculated according to the following equation, as shown in Table 6.

$$w_{(i)} = \frac{w_{s(i)} \cdot w_{o(i)}}{\sum_{i=1}^{n} w_{s(i)} \cdot w_{o(i)}}$$

(4) Calculation and Analysis of Optimization Results

A comprehensive optimization value is determined by a relative membership degree and the comprehensive weight of each optimization index under different reinforcement schemes:

$$k_{(j)} = \sum_{i=1}^{n} \sum_{j=1}^{m} w_{(i)} \cdot r_{(i,j)}$$

TABLE 7

The optimization results of different reinforcement schemes.

| | Reinforcement scheme | | |
|---|---|---|---|
| SN | Pile length (m) | Pile position | Optimization result |
| 1 | 4 | 0.1 | 79.9948 |
| 2 | 6 | | 80.3357 |
| 3 | 8 | | 80.3543 |
| 4 | 10 | | 80.3840 |
| 5 | 12 | | 80.3811 |
| 6 | 12 | 0.3 | 80.5697 |
| 7 | 16 | | 83.7650 |
| 8 | 18 | | 85.1829 |
| 9 | 20 | | 85.3178 |
| 10 | 24 | | 85.1762 |
| 11 | 16 | 0.5 | 80.4338 |
| 12 | 20 | | 84.4149 |
| 13 | 24 | | 88.4115 |
| 14 | 26 | | 94.0894 |
| 15 | 28 | | 95.0435 |
| 16 | 20 | 0.7 | 82.0237 |
| 17 | 24 | | 85.6163 |
| 18 | 28 | | 90.2414 |
| 19 | 30 | | 92.1504 |
| 20 | 32 | | 92.1377 |
| 21 | 20 | 0.9 | 81.6198 |
| 22 | 22 | | 82.7012 |
| 23 | 26 | | 82.4512 |
| 24 | 28 | | 82.6893 |
| 25 | 30 | | 82.6579 |

Step 106: Determine an optimal anti-slide pile reinforcement scheme according to the comprehensive optimization value, and determine whether the optimal anti-slide pile reinforcement scheme meets the optimization objective.

Based on the multi-objective comprehensive optimization results of the reinforcement schemes in Step 105 and combined with the optimal determination principle, the reinforcement scheme 15 has the largest optimization value, which not only meets the requirements of improving the stability of the slope and the safety of the anti-slide piles, but also conforms to the actual engineering experience.

Step 107: Carry out slope reinforcement according to the optimal anti-slide pile reinforcement scheme.

Scheme 15 is recommended for slope reinforcement design, that is, the anti-slide pile is located in the middle of the slope, the pile length is 28 m, and the pile spacing is 5 m.

The present disclosure further provides an optimal design system for slope reinforcement with anti-slide piles. The system includes a slope type and optimization objective determination module, a first modeling module, a second modeling module, an optimization index determination module, a comprehensive optimization value calculation module, an optimal anti-slide pile reinforcement scheme determination module and a reinforcement module.

The slope type and optimization objective determination module is used for determining a type of a slope to be reinforced with anti-slide piles and an optimization objective.

The first modeling module is used for modeling the type of the slope to obtain a 3D slope numerical calculation model.

The second modeling module is used for establishing different numerical calculation models for anti-slide piles according to different reinforcement schemes of the anti-slide piles.

The optimization index determination module is used for determining optimization indexes through a coupling analysis of the 3D slope numerical calculation model and the anti-slide pile numerical calculation model, the optimization indexes including factor of safety, bending moment, shear force and deflection of the anti-slide piles.

The comprehensive optimization value calculation module is used for calculating a comprehensive optimization value according to the optimization index.

The optimal anti-slide pile reinforcement scheme determination module is used for determining an optimal anti-slide pile reinforcement scheme according to the comprehensive optimization value, and determining whether the optimal anti-slide pile reinforcement scheme meets the optimization objective.

The reinforcement module is used for carrying out slope reinforcement according to the optimal of anti-slide pile reinforcement scheme if the optimal anti-slide pile reinforcement scheme meets the optimization objective.

Each embodiment in the specification of the present disclosure is described in a progressive manner. Each embodiment focuses on the difference from other embodiments, and the same and similar parts between the embodiments may refer to each other. For the system disclosed in the embodiment, since the system corresponds to the method disclosed in the embodiment, the description is relatively simple, and reference may be made to the method description.

Several embodiments are used for illustration of the principles and implementations of the present disclosure. The description of the embodiments is used to help illustrate the method and its core principles of the present disclosure. In addition, those skilled in the art can make various modifications in terms of specific embodiments and scope of application in accordance with the teachings of the present disclosure. In conclusion, the content of the present specification should not be construed as a limitation to the present disclosure.

What is claimed is:

1. An optimal design method for slope reinforcement with anti-slide piles, comprising the steps of:
   determining a slope type of a slope to be reinforced with anti-slide piles and an optimization objective;
   modeling the slope based on the slope type to obtain a three-dimensional (3D) slope numerical calculation model;
   establishing different numerical calculation models for anti-slide piles according to different reinforcement schemes of the anti-slide piles, each reinforcement scheme comprising pile body parameters, pile locations, pile section parameters, pile lengths, and pile spacings;
   determining optimization indexes through a coupling analysis of the 3D slope numerical calculation model and the anti-slide pile numerical calculation model, the optimization indexes comprising a factor of safety, a bending moment, a shear force and a deflection of the anti-slide piles, the factor of safety being a positive index, which is normalized as follows:

$$r_{(i,j)} = \alpha + \beta \cdot e^{\frac{a_{(i,j)} - a_{(i,j)max}}{a_{(i,j)max} - a_{(i,j)min}}}$$

the bending moment, the shear force, and the deflection of the anti-slide piles being negative indexes, which are normalized as follows:

$$r_{(i,j)} = \alpha + \beta \cdot e^{\frac{a_{(i,j)min} - a_{(i,j)}}{a_{(i,j)max} - a_{(i,j)min}}}$$

$a_{(i,j)min}$ and $a_{(i,j)max}$ respectively representing a minimum value and a maximum value of an i-th optimization index in a j-th anti-slide pile reinforcement scheme; $r_{(i,j)}$ represents an optimization index value after normalization, that is, the relative membership degree; $\alpha$ and $\beta$ are constants, which satisfy $\alpha+\beta=100$;
   calculating a comprehensive optimization value according to the optimization index;
   determining an optimal anti-slide pile reinforcement scheme according to the comprehensive optimization value, and determining whether the optimal anti-slide pile reinforcement scheme meets the optimization objective;
   preparing corresponding piles according to the pile body parameters, the pile section parameters, and the pile lengths in the optimal anti-slide pile reinforcement scheme and driving the corresponding piles into the slope according to the pile locations and the pile spacings in the optimal anti-slide pile reinforcement scheme for reinforcing the slope when the optimal anti-slide pile reinforcement scheme is determined to meet the optimization objective; and
   re-determining an optimal anti-slide pile reinforcement scheme when the optimal anti-slide pile reinforcement scheme is determined not to meet the optimization objective;
   the calculating a comprehensive optimization value according to the optimization index further comprising normalizing the optimization index to obtain a relative membership degree;
   calculating a comprehensive weight of the optimization index; and
   calculating a comprehensive optimization value according to the relative membership degree and the comprehensive weight of the optimization index;
   the comprehensive optimization value being calculated as follows:

$$k_{(j)} = \sum_{i=1}^{n} w_{(i)} \cdot r_{(i,j)}$$

$k_{(j)}$ representing a comprehensive optimization value of the j-th anti-slide pile reinforcement scheme; $w_{(i)}$ representing a comprehensive weight of the optimization index; $r_{(i,j)}$ representing a relative membership degree of the i-th optimization index in the j-th anti-slide pile reinforcement scheme; and n representing a count of the optimization indexes.

2. The optimal design method for slope reinforcement with anti-slide piles according to claim 1, wherein
   a numerical simulation technology is used to establish the 3D slope numerical calculation model and the anti-slide pile numerical calculation model, and perform the coupling analysis of the 3D slope numerical calculation model and the anti-slide pile numerical calculation model.

3. The optimal design method for slope reinforcement with anti-slide piles according to claim 1, wherein
   the comprehensive weight of the optimization index is calculated as follows:

$$w_{(i)} = \frac{w_{s(i)} \cdot w_{o(i)}}{\sum_{i=1}^{n} w_{s(i)} \cdot w_{o(i)}}$$

wherein, $w_{(i)}$ represents the comprehensive weight of the optimization index; $w_{s(i)}$ and $w_{o(i)}$ represent a subjective weight and an objective weight of the optimization index; n represents a count of the optimization indexes;
   the objective weight of the optimization index is determined by using an entropy method and expressed as follows:

$$w_{o(i)} = \frac{1 - e_{(i)}}{\sum_{i=1}^{n} (1 - e_{(i)})}$$

wherein, $e_{(i)}$ represents an entropy of the i-th optimization index.

4. An optimal design system for slope reinforcement with anti-slide piles, comprising:
   a processor and a memory storing program codes, the processor executing the stored program codes for
   determining a slope type of a slope to be reinforced with anti-slide piles and an optimization objective;
   modeling the slope based on the slope type to obtain a 3D slope numerical calculation model;
   establishing different numerical calculation models for anti-slide piles according to different reinforcement schemes of the anti-slide piles, each reinforcement scheme including pile body parameters, pile locations, pile section parameters, pile lengths, and pile spacings;

determining optimization indexes through a coupling analysis of the 3D slope numerical calculation model and the anti-slide pile numerical calculation model, the optimization indexes comprising a factor of safety, a bending moment, a shear force and a deflection of the anti-slide piles, the factor of safety being a positive index, which is normalized as follows:

$$r_{(i,j)} = \alpha + \beta \cdot e^{\frac{a_{(i,j)} - a_{(i,j)max}}{a_{(i,j)max} - a_{(i,j)min}}}$$

the bending moment, the shear force, and the deflection of the anti-slide piles being negative indexes, which are normalized as follows:

$$r_{(i,j)} = \alpha + \beta \cdot e^{\frac{a_{(i,j)min} - a_{(i,j)}}{a_{(i,j)max} - a_{(i,j)min}}}$$

$a_{(i,j)min}$ and $a_{(i,j)max}$ respectively representing a minimum value and a maximum value of an i-th optimization index in a j-th anti-slide pile reinforcement scheme; $r_{(i,j)}$ represents an optimization index value after normalization, that is, the relative membership degree; $\alpha$ and $\beta$ are constants, which satisfy $\alpha+\beta=100$;

calculating a comprehensive optimization value according to the optimization index;

determining an optimal anti-slide pile reinforcement scheme according to the comprehensive optimization value, and determining whether the optimal anti-slide pile reinforcement scheme meets the optimization objective;

redetermining an optimal anti-slide pile reinforcement scheme when the optimal anti-slide pile reinforcement scheme is determined not to meet the optimization objective until the optimal anti-slide reinforcement scheme meets the optimization objective;

preparing the corresponding piles according to the pile body parameters, the pile section parameters, and the pile lengths in the optimal anti-slide pile reinforcement scheme; and driving the corresponding piles into the slope according to the pile locations and the pile spacings in the optimal anti-slide pile reinforcement scheme for reinforcing the slope when the optimal anti-slide pile reinforcement scheme is determined to meet the optimization objective;

the calculating a comprehensive optimization value according to the optimization index further includes normalizing the optimization index to obtain a relative membership degree;

calculating a comprehensive weight of the optimization index; and calculating a comprehensive optimization value according to the relative membership degree and the comprehensive weight of the optimization index;

the comprehensive optimization value being calculated as follows:

$$k_{(j)} = \sum_{i=1}^{n} w_{(i)} \cdot r_{(i,j)}$$

$k_{(j)}$ representing a comprehensive optimization value of the j-th anti-slide pile reinforcement scheme; $w_{(i)}$ representing a comprehensive weight of the optimization index; $r_{(i,j)}$ representing a relative membership degree of the i-th optimization index in the j-th anti-slide pile reinforcement scheme; and n representing a count of the optimization indexes.

* * * * *